(12) United States Patent
Shen et al.

(10) Patent No.: US 9,196,262 B2
(45) Date of Patent: Nov. 24, 2015

(54) USER SENSING SYSTEM AND METHOD FOR LOW POWER VOICE COMMAND ACTIVATION IN WIRELESS COMMUNICATION SYSTEMS

(71) Applicant: QUALCOMM Incorporated, San Diego, CA (US)

(72) Inventors: Jian Shen, San Diego, CA (US); Tongzeng Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 329 days.

(21) Appl. No.: 13/826,840

(22) Filed: Mar. 14, 2013

(65) Prior Publication Data
US 2014/0278437 A1 Sep. 18, 2014

(51) Int. Cl.
*G10L 21/00* (2013.01)
*G10L 21/06* (2013.01)
*H04W 52/02* (2009.01)
*G10L 25/78* (2013.01)

(52) U.S. Cl.
CPC ........... *G10L 21/06* (2013.01); *H04W 52/0254* (2013.01); *G10L 2025/786* (2013.01)

(58) Field of Classification Search
CPC ......... G10L 25/78; G10L 15/20; G10L 15/28; G10L 15/30; G10L 2015/088; G10L 2021/02165; G10L 2025/786; G10L 21/0208; G10L 21/0316; G10L 21/06; G10L 25/48; G10L 25/95; G06F 1/3203; H04R 1/406; H04R 2201/401; H04W 76/025; H04W 88/02; H04W 88/181

USPC ......... 704/231, 233, 254, 275, 226, 214, 207, 704/227, 228; 455/570, 296; 370/406.08, 370/406.06, 388.04, 406.01, 88.01, 406.05, 370/88.03, 221.11; 381/56, 110
See application file for complete search history.

(56) References Cited

U.S. PATENT DOCUMENTS

| | | | |
|---|---|---|---|
| 7,418,392 | B1 | 8/2008 | Mozer et al. |
| 8,184,093 | B2 | 5/2012 | Tsuiki |
| 8,311,546 | B2 | 11/2012 | Boudreau et al. |
| 2003/0046554 | A1 | 3/2003 | Leydier et al. |

(Continued)

FOREIGN PATENT DOCUMENTS

WO WO-2012025784 A1 3/2012

OTHER PUBLICATIONS

Database WPI Week 200912, Thomson Scientific, London, GB, AN 2009-E93213, XP002728929, & KR20080088261A (LG Electronics Inc) Oct. 2, 2008.

(Continued)

*Primary Examiner* — Vijay B Chawan
(74) *Attorney, Agent, or Firm* — Kilpatrick Townsend Stockton LLP

(57) ABSTRACT

A method of activating voice control on a wireless device includes sampling signals from a plurality of sensors on the device, determining if the device is in a hands-on state by a user on the basis of the signal sampling, and enabling a voice activated detection (VAD) application on the device on the basis of the determination. A voice controlled apparatus in a wireless device includes a plurality of sensors arranged on the device, a microphone, a controller to sample signals from one or more of the plurality of sensors, a processor coupled to the controller, and a voice activated detection (VAD) application running on the processor coupled to the controller and the microphone.

43 Claims, 4 Drawing Sheets

(56) References Cited

U.S. PATENT DOCUMENTS

| | | |
|---|---|---|
| 2006/0061042 A1* | 3/2006 | Nakamura et al. ............ 277/432 |
| 2006/0239471 A1* | 10/2006 | Mao et al. ...................... 381/92 |
| 2007/0110263 A1* | 5/2007 | Brox ............................. 381/110 |
| 2007/0147285 A1* | 6/2007 | Jin et al. ........................ 370/329 |
| 2007/0195074 A1 | 8/2007 | Gelissen |
| 2010/0042827 A1 | 2/2010 | Pratt et al. |
| 2012/0198339 A1 | 8/2012 | Williams et al. |
| 2013/0282373 A1* | 10/2013 | Visser et al. .................. 704/233 |
| 2014/0257821 A1 | 9/2014 | Adams et al. |

OTHER PUBLICATIONS

International Search Report and Written Opinion—PCT/US2014/023079-ISA/EPO—Sep. 9, 2014 (130114W0).

Toward More Sensitive Mobile Phones, Ken Hinckley and Eric Horvitz, Microsoft Research, One Microsoft Way, Redmond, WA 98052, Nov. 11/14, 2001, pp. 2.

* cited by examiner

# USER SENSING SYSTEM AND METHOD FOR LOW POWER VOICE COMMAND ACTIVATION IN WIRELESS COMMUNICATION SYSTEMS

BACKGROUND

1. Field

The present disclosure relates generally to wireless communication systems. More specifically the present disclosure relates to methods and apparatus for minimizing power consumption in voice activated control by sensing user contact to activate voice control affected systems.

2. Background

Wireless communication devices have become smaller and more powerful as well as more capable. Increasingly users rely on wireless communication devices for mobile phone use as well as email and Internet access. At the same time, devices have become smaller in size. Devices such as cellular telephones, personal digital assistants (PDAs), laptop computers, and other similar devices provide reliable service with expanded coverage areas. Such devices may be referred to as mobile stations, stations, access terminals, user terminals, subscriber units, user equipments, and similar terms.

A wireless communication system may support communication for multiple wireless communication devices at the same time. In use, a wireless communication device may communicate with one or more base stations by transmissions on the uplink and downlink. Base stations may be referred to as access points, Node Bs, or other similar terms. The uplink or reverse link refers to the communication link from the wireless communication device to the base station, while the downlink or forward link refers to the communication from the base station to the wireless communication devices.

Wireless communication systems may be multiple access systems capable of supporting communication with multiple users by sharing the available system resources, such as bandwidth and transmit power. Examples of such multiple access systems include code division multiple access (CDMA) systems, time division multiple access (TDMA) systems, frequency division multiple access (FDMA) systems, wideband code division multiple access (WCDMA) systems, global system for mobile (GSM) communication systems, enhanced data rates for GSM evolution (EDGE) systems, and orthogonal frequency division multiple access (OFDMA) systems.

Minimizing the power consumption of a mobile communication device is highly desirable. Voice activation and command is a feature with increasing popularity on mobile devices. Conventionally, at least part of the voice detection system may be running all the time. To conserve battery on a mobile device, it is desirable to turn off mobile device functions as much as possible. Existing solutions include manually pressing the power button, where a voice activation detection (VAD) module is running all the time, and a wake-up audio subsystem (LPASS) and application processor (AP) become active when needed.

There is a need, therefore, for an approach to activation of a voice control process that is disabled to conserve power when not needed, and activated with appropriate detection means when required.

SUMMARY

A method of activating voice controlled command on a device includes sampling signals from a plurality of touch sensors on the device, determining if the device is in a hands-on state by a user on the basis of the signal sampling, and enabling a voice activated detection (VAD) application on the device on the basis of the determination.

In an embodiment, a method of activating voice controlled command on a device includes sampling signals from a plurality of touch sensors on the device, determining if the device is in a hands-on state by a user on the basis of the signal sampling, and enabling a voice activated detection (VAD) application on the device on the basis of the determination.

In an embodiment, a voice command control apparatus included in a device includes a plurality of touch sensors arranged on one or more surfaces of the device, a microphone arranged on the device, a controller coupled to the sensors to sample signals from one or more of the plurality of sensors, a processor comprising an audio processor coupled to the controller, and a voice activated detection (VAD) application running on the processor coupled to the controller and the microphone.

In an embodiment, a voice command control apparatus included in a device includes a plurality of sensing means arranged on one or more surfaces of the device, a sound detection means arranged on the device, a controlling means coupled to the sensing means to sample signals from one or more of the plurality of sensing means, a processing means coupled to the controlling means, and a voice activated detection (VAD) means operable on the processing means responsive to the controlling means and the sound detection means.

In an embodiment, a voice command control apparatus included in a device includes means for sampling signals from a plurality of touch sensors on one or more surfaces of the device, means for determining if the device is in a hands-on state by a user on the basis of the signal sampling, and means for enabling a voice activated detection (VAD) application on the device on the basis of the determination.

In an embodiment, a non-transitory computer readable media including instructions which when executed by a processor cause the processor to perform the method of activating voice controlled command on a device, including sampling signals from a plurality of touch sensors on one or more surfaces of the device, determining if the device is in a hands-on state by a user on the basis of the signal sampling, and enabling a voice activated detection (VAD) application on the device on the basis of the determination.

DETAILED DESCRIPTION

Figure 1:
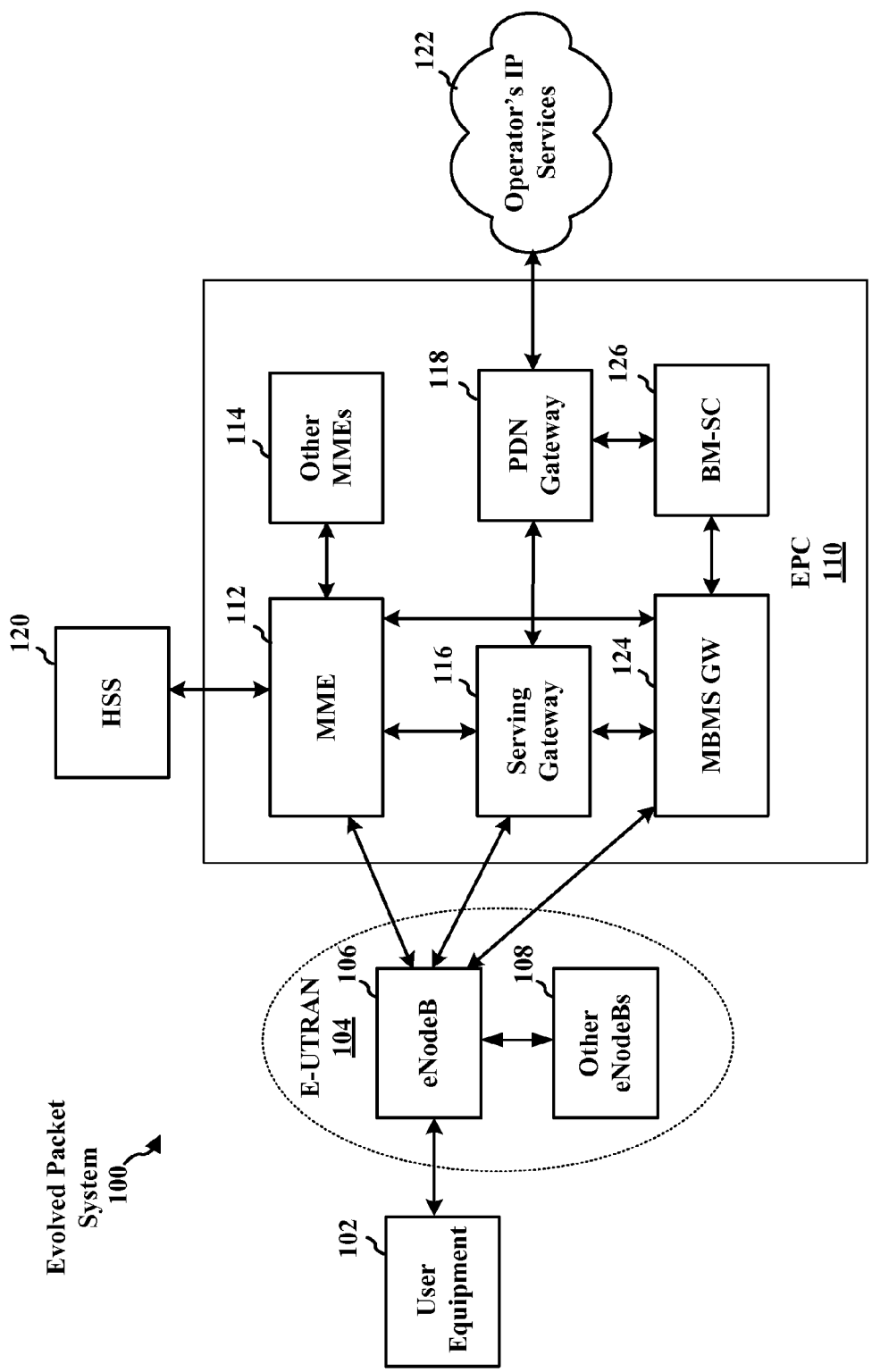
FIG. 1 illustrates one configuration of a wireless communication system, in accordance with certain embodiments of the disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

As used herein, the term "determining" encompasses a wide variety of actions and therefore, "determining" can include calculating, computing, processing, deriving, investigating, looking up (e.g., looking up in a table, a database or another data structure), ascertaining and the like. Also, "determining" can include resolving, selecting choosing, establishing, and the like.

The phrase "based on" does not mean "based only on," unless expressly specified otherwise. In other words, the phrase "based on" describes both "based only on" and "based at least on."

Moreover, the term "or" is intended to man an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The various illustrative logical blocks, modules, and circuits described in connection with the present disclosure may be implemented or performed with a general purpose processor, a digital signal processor (DSP), an application specific integrated circuit (ASIC), a field programmable gate array (FPGA), or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM, and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage, or other magnetic storage devices, or any other medium that can be used to carry or store desired program code in the form of instructions or data structures and that can be accessed by a computer. As used herein, disk and disc, includes compact disk (CD), laser disk, optical disc, digital versatile disk (DVD), floppy disk, and Blu-ray® disc, where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

Furthermore, various aspects are described herein in connection with a terminal, which may be a wired terminal or a wireless terminal A terminal may also be called a system, device, subscriber unit, subscriber station, mobile station, mobile, mobile device, remote station, remote terminal, access terminal, user terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband CDMA (W-CDMA). CDMA2000 covers IS-2000, IS-95 and technology such as Global System for Mobile Communication (GSM).

An OFDMA network may implement a radio technology such as Evolved UTRA (E-UTRA), the Institute of Electrical and Electronics Engineers (IEEE) 802.11, IEEE 802.16, IEEE 802.20, Flash-OFDAM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3$^{rd}$ Generation Partnership Project" (3GPP). CDMA2000 is described in documents from an organization named "3$^{rd}$ Generation Partnership Project 2" (3GPP2). These various radio technologies and standards are known in the art. For clarity, certain aspects of the techniques are described below for LTE, and LTE terminology is used in much of the description below. It should be noted that the LTE terminology is used by way of illustration and the scope of the disclosure is not limited to LTE. Rather, the techniques described herein may be utilized in various application involving wireless transmissions, such as personal area networks (PANs), body area networks (BANs), location, Bluetooth, GPS, UWB, RFID, and the like. Further, the techniques may also be utilized in wired systems, such as cable modems, fiber-based systems, and the like.

Single carrier frequency division multiple access (SC-FDMA), which utilizes single carrier modulation and frequency domain equalization has similar performance and essentially the same overall complexity as those of an OFDMA system. SC-FDMA signal may have lower peak-to-average power ration (PAPR) because of its inherent single carrier structure. SC-FDMA may be used in the uplink communications where the lower PAPR greatly benefits the mobile terminal in terms of transmit power efficiency.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS may interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN may include the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface, the interface between eNBs. The interface is mainly used to support active mode User Equipment (UE) mobility. Technical Specification ETSI TS 136 420 describes the X2 Interface).

The eNB 106 may also be referred to as a base station, a base transceiver station, a radio base station, a radio transceiver, a transceiver function, a basic service set (BSS), an extended service set (ESS), or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 may be connected to the EPC 110. The EPC 110 may include a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 may serve as the control node that processes the signaling between the UE 102 and the EPC 110. Generally, the MME 112 may provide bearer and connection management. All user IP packets may be transferred through the Serving Gateway 116, which itself may be connected to the PDN Gateway 118. The PDN Gateway 118 may provide UE IP address allocation as well as other functions. The PDN Gateway 118 may be connected to the Operator's IP Services 122. The Operator's IP Services 122 may include the Internet, an intranet, an IP Multimedia Subsystem (IMS), and a PS Streaming Service (PSS). The BM-SC 126 is the source of MBMS traffic. The MBMS Gateway 124 distributes the MBMS traffic to the eNBs 106, 108.

Figure 2:
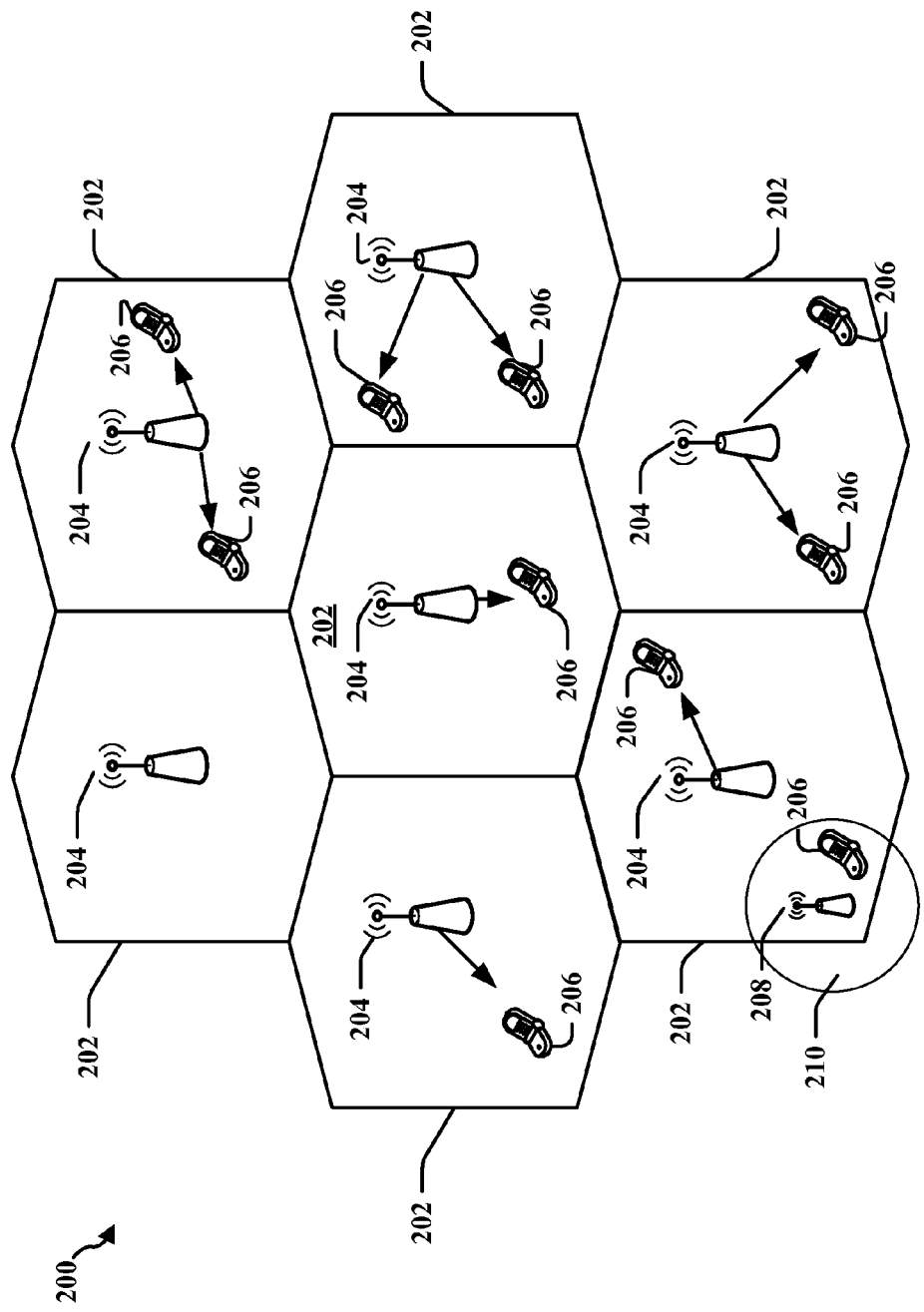
FIG. 2 illustrates a block diagram of an example of electronic components capable of transmitting in accordance with certain embodiments of the disclosure.

FIG. 2 is a diagram illustrating an example of an access network 200 in an LTE network architecture. In this example, the access network 200 may be divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 may each be assigned to a respective cell 202 and may be configured to provide an access point to the EPC 110 for all the UEs 206 in the cells 202. There is no centralized controller in this example of an access network 200, but a centralized controller may be used in alternative configurations. The eNBs 204 may be responsible for all radio related functions including radio bearer control, admission control, mobility control, scheduling, security, and connectivity to the serving gateway 116.

The modulation and multiple access scheme employed by the access network 200 may vary according to the particular telecommunications standard being deployed. For example, in LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology may enable the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate, or transmitted to multiple UEs 206 to increase the overall system capacity. This may be achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

The power required by a UE 206 for all such UL and DL activities may be a significant component of the total power draining a battery or other power source, where the UE 206 is mobile and not readily connected to external power. A means for conserving power to prolong operability may be highly advantageous.

Power control enables an improved conservation of battery power to prolong UE operability between recharges. There is a need therefore to reduce power consumption by initiating user controlled processes such as voice command only when the status of selected sensors warrants a need for additional processes.

Contact sensing, such as touch sensing, may be used to activate processes such as voice detection and implementation of voice commands in various communication devices. Such devices may include wireless mobile devices, such as smart phones, tablet computers and the like. Voice command activation may be implemented when the device is portable and relies on battery power. Examples of voice command include voice dialing by speaking a phone number or address book entry into a microphone, which is recognized to initiate a call, or verbal inquiry to a smart phone to query a database at a remote server.

Figures 3A, 3B:
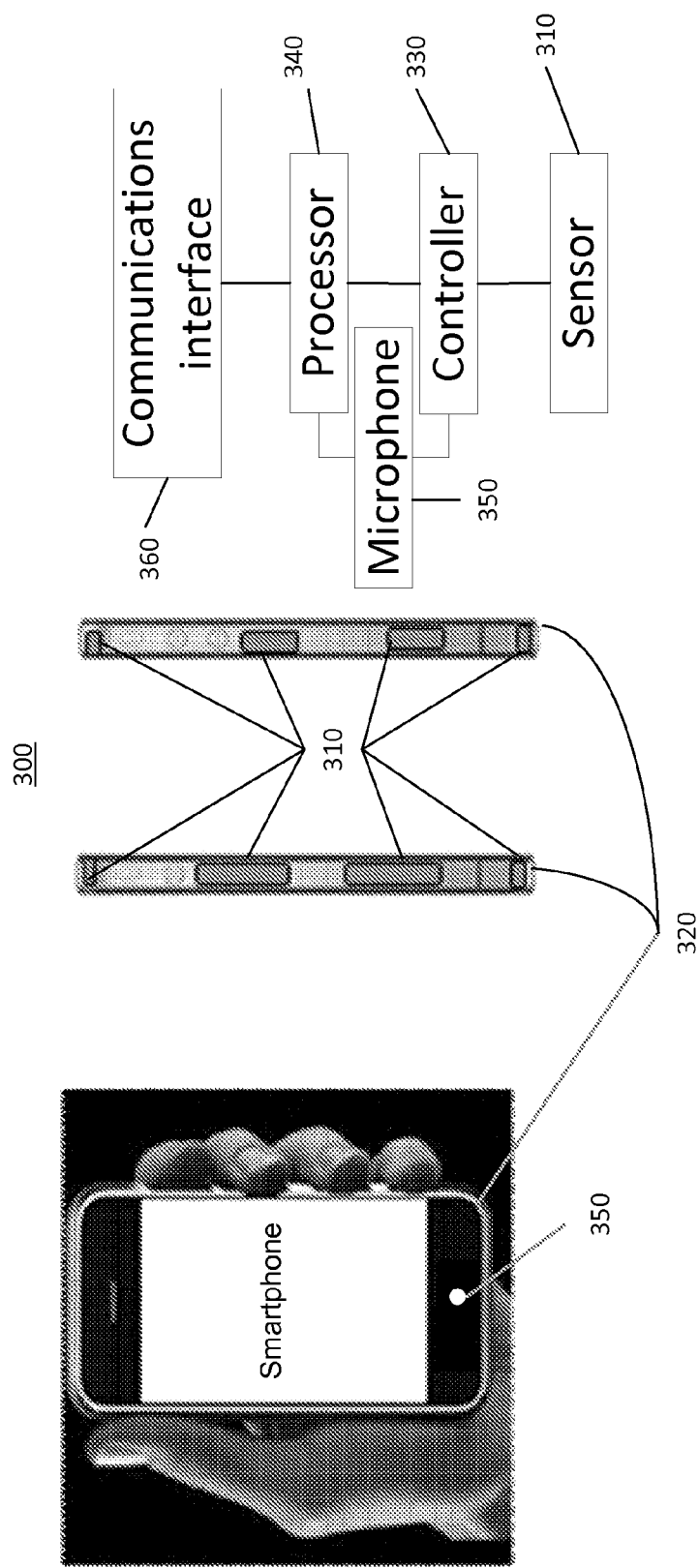
FIG. 3A illustrates a wireless communication device having contact sensors at various locations, in accordance with an embodiment of the disclosure.
FIG. 3B is a block diagram illustrating a configuration of a sensor, sensor controller, microphone and processor, in accordance with an embodiment of the disclosure.

In an embodiment, sensors may be mounted on two or more edges of the device to detect a user's hand contact with the device as illustrated in FIG. 3A. The sensors may be capacitive, resistive, thermoelectric, piezoelectric sensor, temperature gradient sensors, or the like. For example, a piezoelectric sensor may generate a transient voltage signal when compressed, and the voltage may be detected by a sampling circuit to initiate other processes that require power only when in use. Other types of sensors may rely on different forms of electric or magnetic stimulus produced by contact, but the objective is typically similar, e.g., to induce a voltage that may be detected to initiate a process. When contact is detected on at least two edges/surfaces it may be termed "hand-on"; otherwise it is "hands-off." For example, if a smart phone rests in isolation on a single side, the signals generated may be interpreted as not being gripped in a "hands on" configuration by the user. However, detection need not be limited to signals from at least two edges and or surfaces, and a single contact may be sufficient.

In an embodiment, the sensor(s) may be periodically sampled, preferably at a low duty cycle (e.g., less than 50%, but more preferably, as low as 1% and even less, but greater than 0%). The sensor may be sampled for a short time interval to detect a user presence, i.e., when the user is holding the device, and use is determined by comparison of a sensor signal level to a threshold signal level. If the sensor signal satisfies the threshold minimum requirement, an action may be taken to activate one or more processes. A controller may provide the current and voltages to operate the one or more sensors. The controller may power circuitry adapted to detect the sensor signal, compare the sensor signal level to the threshold signal level and issue an output signal to initiate one or more application processes, one of which may be voice detection. Voice detection may be accomplished through a microphone. Other processes may further include voice recognition, analysis and activation of other processes (such as opening and running applications stored on the device) on the basis of the voice command issued after voice detection is initiated.

In an embodiment, the controller may be a single processor adapted to control several, or all, functions and processes of the wireless communication device, including communications. In an embodiment, the controller may be a low level control device with minimal functionality, dedicated to activating and interrogating the sensors and corresponding operable circuitry at a low duty cycle, while leaving the sensors dormant, i.e., without power or in a low-power state, at other times. The controller may be coupled to a main processor or several other processors, one or more of which may be tasked with initiating various processes, including, but not limited to, voice detection, voice pattern recognition and command generation of various applications on the basis of the voice pattern recognition. Thus, the controller, because of its low level of functionality and operating requirements, e.g., operating the sensors, measuring and comparing the sensor signal levels generated therefrom, may require less power than a higher level processor which, because of its higher computational requirements and capabilities, may consume more energy. Thus, the controller is adapted to determine, at a low duty cycle, and a lower level of instantaneous and/or average power, whether to activate processes requiring more processor power consumption.

As shown in FIG. 3A, a smart phone assembly 300 incorporating sensors 310 may be located, for example, along the edges of a mobile device 320, such as a smart phone, (and may include locations at the top or bottom, as well, not shown). Sensors 310 that may be adapted to detect the "hands-on" state may include piezoelectric, pyroelectric, capacitive, thermoelectric, piezoresistive sensing elements, or the like.

For example, a piezoresistive sensor may include a Wheatstone bridge, which is well known in the art of pressure sensing. One resistor in the bridge is a membrane resistor, wherein the value of resistance is sensitive to pressure or deformation of the membrane, and a "bridge" resistor exhibits substantially little or no current flow when the other resistors are balanced" in resistance value. A change in the sensing resistor causes a current across a bridge resistor, where the voltage drop induced is a measure of pressure on the resistor membrane. Circuitry coupled to the Wheatstone bridge to detect contact pressure on membrane resistor may be powered at a low duty cycle, i.e., the circuit may be unpowered most of the time, thus drawing no current. Similarly, a thermoresistive Wheatstone bridge may be used to sense a change in resistance when thermal contact from the user's finger changes the sensing element's resistance.

Alternatively, a piezoelectric sensor may include a piezoelectric transducer element that may generate a voltage impulse when contacted in compression by a user handling the mobile device 320. The voltage impulse (which may be amplified) may be detected to power up circuitry for voice detection and voice activated control. In the same spirit, a variety of sensing modalities may be combined with appropriate circuitry and operated in a low duty cycle mode to detect the "hands on" or "hands off" state of the mobile device to conserve operational power.

When the sensors 310 detect a user in "hands on" contact with the mobile device 320, one or more applications may be activated that are responsive to voice commands received via a microphone 350.

Referring to FIG. 3B, when a user presence is detected by the sensors 310, processes responsive to voice commands detected by the microphone 350 may be initiated by a controller 330. Controller 330 may be coupled to the sensors 310 and the microphone 350 to initiate an application for voice activation detection and interpretation (VAD) running on a processor 340 that interprets voice commands on the basis of signals received from the controller 330. Alternatively, the processor 340, which may comprise an audio processor, may be coupled to a communications interface, which may be wireless, for accessing a remote server adapted to interprets voice commands and provide response instruction back to the mobile device 320.

The controller 330 may sample the sensors 310 on a periodic or intermittent basis to determine if a "hands-on" condition exists, i.e., when the sensors 310 are contacted by the user. Sampling duty cycles, during which power may be applied to operate the sensors 310 and associated circuitry, may typically vary from 50% to less than 1%, but greater than 0%. Applications activated to run on the processor 340 may connect the device 320 to the cloud, based on the interpretation of the voice command, if access to remote resources is sought. The voice activated detection (VAD) process may be disabled/halted when processed commands result in completed function, and/or when the device 320 is sampled and found in a "hands-off" state by the controller 330.

Figure 4:
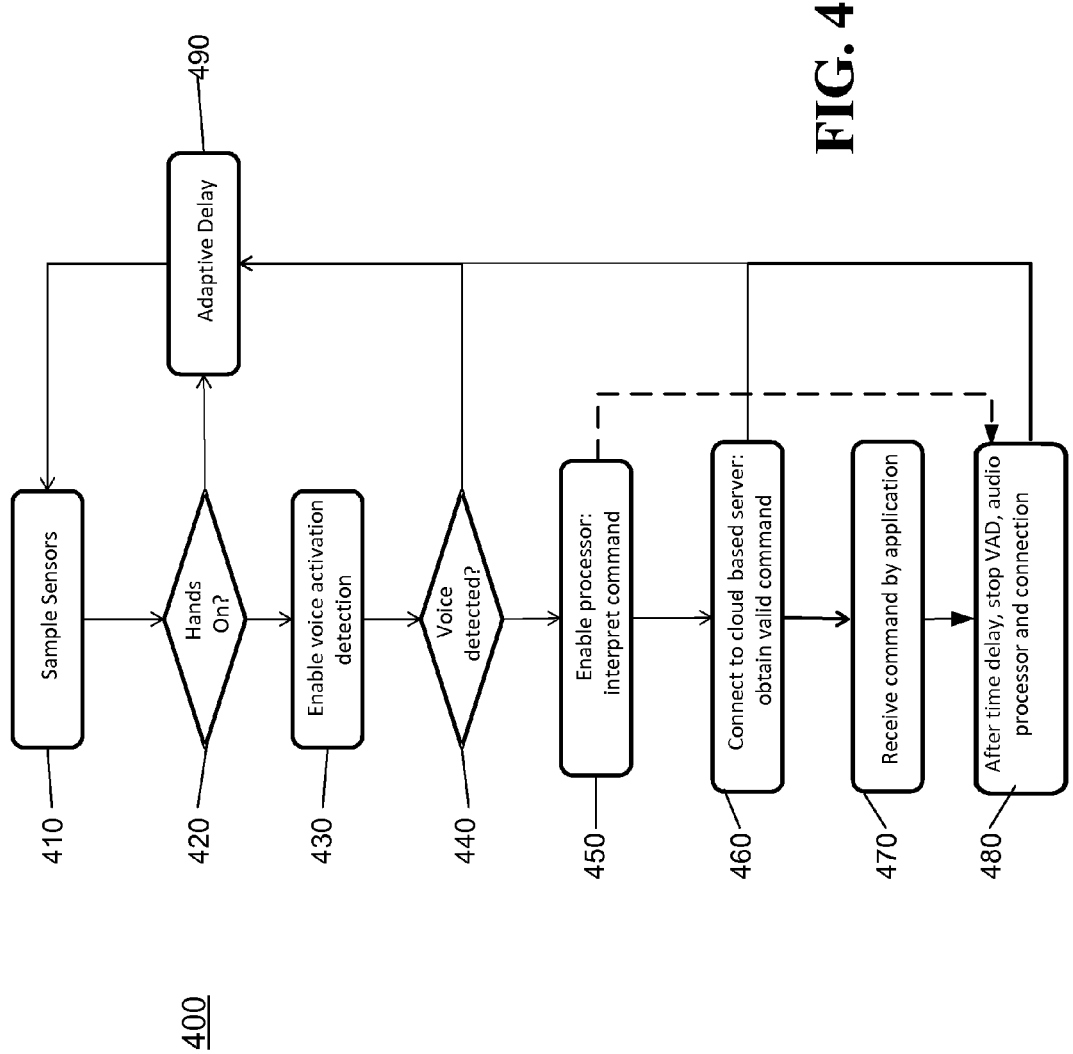
FIG. 4 illustrates a method of voice detection and control, in accordance with an embodiment of the disclosure.

In an embodiment, FIG. 4 illustrates a method 400 of voice detection and control. The method 400 includes sampling signals (process block 410) from one or more touch sensors on a device 320. It is then determined if the device is in a "hands-on" condition on the basis of the signals (decision block 420). If the signals indicate a "hands-on" state of the device 320, a voice activated detection application is then enabled (process block 430). Otherwise, the method continues by returning to process block 410 to continue to sampling signals from the sensors 310 if the device 320 is in a "hands-off" state, where an adaptive (i.e., variable) delay may be inserted between samplings (process block 490). If a voice is detected (decision block 440), the method 400 continues by enabling an audio processor to interpret voice commands (process block 450). Otherwise, the method continues to sample the sensor 310 by returning to process block 410 via the adaptive delay process block 490. If the processor 340 is enabled in decision block 450, it may optionally be enabled to communicate (process block 460) with a remote cloud server, if required, to obtain (process block 470) valid commands on the basis of the interpreted voice command and forward to the application on the user device 320. The operation of VAD, and communication with the cloud server by processor 340 may cease or halt (process block 480) when at least one condition of no voice is detected after a delay time, and the device is found in a "hands-off" condition. Following the steps of decision blocks 420, 440, and process blocks 460 and 480, the method proceeds by returning to process block 410 to sample the sensors, where an adaptive delay may be inserted to determine the effective duty cycle of the sensor sampling rate. Alternatively, the application on the user device 320 may generate command instructions internally, without connecting to the cloud-based server, and execute instructions directly within the application located on the processor 340, and proceed from process block 450 to process block 480.

To conserve battery power in a mobile device such as a smart phone, the duty cycle may preferably be 50% or less. More preferably, the duty cycle may be greater than 0% and less than 10% to further reduce power consumption requirements as much as desired, for the sampling and voice activation method 400, as shown, for example, in FIG. 4. The duty cycle may be selected to balance between power savings and adequate sampling to detect "hands on." When there is no "hands-on" contact with the sensors for a protracted period, the adaptive delay may be increased to correspond to extended periods of inactive use of the smart phone.

Determining the "hands-on" state of the mobile device 320 may proceed in various ways. For example, when sampled, the sensor signal may be a voltage output level that may be compared to a threshold level, set as a reference point at a value to distinguish a signal from noise, in circuitry, e.g., using operational amplifiers as comparators. The sensed signal must match or exceed the reference in order to enable the audio processor and interpret the commands. Capacitance based sensors may detect a change in the electrostatic field due to contact with the users body (e.g., fingertip), which is an electrical conductor, which is detected as a change in capacitance. Again, the change in capacitance may be translated by circuitry to produce a signal (e.g., as an analog voltage or digital value) that distinguishes the sensed signal due to user contact from a background level of an untouched sensor. The combination of a "hands-on" state and voice detection provides a logical condition to activate circuits, affected software, including but not limited to the VAD, and one or more processors 340 from a low power (idle) state or off state to an on state, thereby enabling audio processing and spoken command interpretation and (optional) cloud communication to obtain commands.

It may be appreciated that using a sensor 310 may be an easier means of establishing a "hands-on" state to enable voice detection than pressing a power button to activate voice detection. There is no need to maintain any part of the audio and/or A/D circuitry in an operational state, which consumes power, when no voice signal is detected. The consequence is a savings in battery power and extension of device operational lifetime on a single charge.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method of activating voice control on a wireless device, comprising:
    sampling signals from a plurality of sensors on the device;
    determining if the device is in a hands-on state by a user on the basis of the signal sampling; and
    enabling a voice activated detection (VAD) application on the device on the basis of the determination.

2. The method of claim 1, wherein the sampling comprises periodically activating at least one of the plurality of the sensors in a duty cycle.

3. The method of claim 2, wherein the duty cycle comprises a first time period defining a time duration during which the sensors are activated and a second time period defining a repetition rate of the first time period, the duty cycle being a of the first time period to the second time period ratio less than 1.

4. The method of claim 3, wherein the duty cycle is equal to or less than 50% and greater than 0%.

5. The method of claim 1, wherein determining the hands-on state comprises comparing a level of the sampled signals to a threshold level, and activating the hands-on state when the sampled signals equal or exceed the threshold level.

6. The method of claim 5, wherein the threshold level is a reference level specified to distinguish the user's hands-on contact with the device from non-contact with at least one sensor.

7. The method of claim 1, further comprising:
    interpreting voice detected by the VAD application using an audio processor;
    communicating by the device with a communications interface to obtain signals from a remote server based on the interpreted voice; and
    halting the operation of the VAD application, audio processor and communication interface.

8. The method of claim 7, further wherein the halting takes place after a delay time based on detecting the device is found in a "hands-off" condition and the VAD does not detect voice.

9. The method of claim 8, wherein the delay time is greater than a specified number of seconds.

10. The method of claim 8, wherein halting comprises disabling at least one of the VAD, the audio processor and the communication interface to one of a standby and an off state.

11. The method of claim 8, wherein the delay time between samplings is dynamically variable.

12. A voice controlled apparatus included in a wireless device, comprising:
    a plurality of sensors arranged on the device;
    a microphone;
    a controller to sample signals from at least one of the plurality of sensors;
    a processor coupled to the controller; and
    a voice activated detection (VAD) application running on the processor and coupled to the controller and the microphone.

13. The apparatus of claim 12, wherein the controller periodically activates at least one of the plurality of the sensors at a duty cycle for sampling output signals.

14. The apparatus of claim 13, wherein the duty cycle comprises a first time period defining a time duration during which the sensors are activated and a second time period defining a repetition rate of the first time period, the duty cycle being a ratio less than 1 of the first time period to the second time period.

15. The apparatus of claim 14, wherein the duty cycle is less than 50% and greater than 0%.

16. The apparatus of claim 12, wherein the controller compares a level of the sampled signals to a threshold level, and activates the hands-on state when the sampled signals equal or exceed the threshold level.

17. The apparatus of claim 16, wherein the threshold level is a reference level specified to distinguish the user's hands-on contact from non-contact with at least one sensor e.

18. The apparatus of claim 12, further comprising:
    an audio processor running the VAD application to interpret voice;
    a communication interface coupled to the audio processor to obtain signals from a remote server based on the interpreted voice, wherein the controller halts operation of the VAD application, audio processor and communication interface for specified conditions after a delay time.

19. The apparatus of claim 18, wherein the specified conditions comprise at least the absence of signals from any of the sensors corresponding to a hands-off state of the wireless device and an absence of detected sound.

20. The apparatus of claim 19, wherein the delay time is greater than a specified number of seconds.

21. The apparatus of claim 18, wherein the halting operation comprises disabling the VAD to one of a standby and an off state.

22. The apparatus of claim 18, wherein the delay time between samplings is dynamically variable.

23. A voice command control apparatus included in a device, comprising:
  means for sensing arranged on one or more surfaces of the device;
  means for detecting sound;
  means for controlling coupled to the sensing means for sampling signals from one or more of the plurality of sensing means;
  means for processing at least one of the sampled signals; and
  means for voice detection and interpretation.

24. The apparatus of claim 23, wherein the means for sensing comprises periodically activating and sampling response signals in a duty cycle from at least one of the sensing means.

25. The apparatus of claim 24, wherein the duty cycle comprises a first time period defining a time duration during which the sensing means are activated and a second time period defining a repetition rate of the first time period, the duty cycle being a ratio less than 1 of the first time period to the second time period.

26. The apparatus of claim 25, wherein the duty cycle is equal to or less than 50% and greater than 0%.

27. The apparatus of claim 24, wherein the means for sensing determines a hands-on state by a user comprises comparing a level of the signals detected by the sensing means to a threshold level, and activating the hands-on state when the detected signals equal or exceed the threshold level.

28. The apparatus of claim 27, wherein the threshold level is a reference level specified to distinguish between the user's hands-on contact and non-contact with the device of each sensing means.

29. The apparatus of claim 23, further comprising:
  means to interpret voice detected by the sound detecting means;
  means to communicate with a remote server to obtain signals based on the interpreted voice; and
  means to halt the operation of the sound detection means, voice interpretation means and communication means.

30. The apparatus of claim 29, wherein the means to halt stops the operations after a delay time based on detecting the device is determined to be in a "hands-off" condition and the voice interpreting means does not detect voice.

31. The apparatus of claim 30, wherein the delay time is greater than a specified number of seconds.

32. The apparatus of claim 30, wherein halting comprises disabling at least one of the voice interpreting means, the audio processing means and the communication means to one of a standby and an off state.

33. The apparatus of claim 30, wherein the delay time between samplings is dynamically variable.

34. A non-transitory computer readable media including instructions which when executed by a processor cause the processor to perform the following steps:
  sampling signals from a plurality of sensors on the device;
  determining if the device is in a hands-on state by a user on the basis of the signal sampling; and
  enabling a voice activated detection (VAD) application on the device on the basis of the determination.

35. The non-transitory computer readable media of claim 34, wherein instructions for sampling comprises code for periodically activating at least one of the plurality of sensors in a duty cycle.

36. The non-transitory computer readable media of claim 35, wherein the duty cycle comprises a first time period defining a time duration during which the sensors are activated and a second time period defining a repetition rate of the first time period, the duty cycle being a ratio of the first time period to the second time period less than 1.

37. The non-transitory computer-readable medium of claim 36, wherein the duty cycle is equal to or less than 50% and greater than 0%.

38. The non-transitory computer-readable medium of claim 34, wherein determining the hands-on state comprises comparing a level of the sampled signals to a threshold level, and activating the hands-on state when the sampled signals equal or exceed the threshold level.

39. The non-transitory computer-readable medium of claim 38, wherein the threshold level is a reference level specified to distinguish the user's hands-on contact with the device from non-contact with at least one sensor.

40. The non-transitory computer-readable medium of claim 34, the instruction further comprising code for:
  interpreting voice detected by the VAD application using an audio processor;
  communicating with a communications interface to obtain signals from a remote server based on the interpreted voice; and
  halting the operation of the VAD application, audio processor and communication interface.

41. The non-transitory computer-readable medium of claim 40, the instruction further comprising code for:
  halting the operations after a delay time based on detecting the device is found in a "hands-off" condition and the VAD does not detect voice.

42. The non-transitory computer-readable medium of claim 40, wherein instructions for halting operations comprises code for disabling at least one of the VAD, the audio processor and the communication interface to one of a standby and an off state.

43. The non-transitory computer-readable medium of claim 40, wherein the delay time between samplings is dynamically variable.

* * * * *